United States Patent

Nakata

[11] Patent Number: 5,463,570
[45] Date of Patent: Oct. 31, 1995

[54] DIGITAL DATA ROUNDING

[75] Inventor: Tetsuro Nakata, Kanagawa, Japan

[73] Assignee: Sony Corporation, Tokyo, Japan

[21] Appl. No.: 105,178

[22] Filed: Aug. 12, 1993

[30] Foreign Application Priority Data

Aug. 21, 1992 [JP] Japan .................... 4-223050

[51] Int. Cl.$^6$ ..................... G06F 7/38
[52] U.S. Cl. ..................... 364/745
[58] Field of Search ................. 364/745

[56] References Cited

U.S. PATENT DOCUMENTS

| 4,589,084 | 5/1986 | Fling et al. | 364/745 |
| 4,592,008 | 5/1986 | Nopper | 364/745 |
| 4,727,506 | 2/1988 | Fling | 364/745 |
| 4,750,146 | 6/1988 | Dalqvist et al. | 364/745 |
| 4,755,961 | 7/1988 | Kuriki et al. | 364/745 |
| 4,831,576 | 5/1989 | Kunimoto | 364/745 |
| 4,965,668 | 10/1990 | Abt et al. | 364/745 |
| 5,182,723 | 1/1993 | Kamimura | 364/748 |
| 5,218,563 | 6/1993 | Juri et al. | 364/745 |
| 5,218,650 | 6/1993 | Blonstein et al. | 364/745 |

Primary Examiner—Tan V. Mai
Attorney, Agent, or Firm—Jay H. Maioli

[57] ABSTRACT

An apparatus and method of signal processing for rounding digital data, such as digital video data, wherein ten-bit digital data may be rounded to eight-bit digital data. Included is a bit pattern generator for generating at least four bit patterns, each bit pattern having at least two single-bit samples. One fixed bit pattern is selected whereby the value of the low-order two bits of the ten-bit digital data is rounded and added to the high-order eight bits to produce rounded eight-bit data. Since fixed bit patterns are used in the rounding process, the rounding of digital video data, and thus picture quality, is improved. In addition, the adverse generation of an inherent vertical bit pattern can be prevented by re-ordering the single-bit samples into a fixed bit pattern.

13 Claims, 16 Drawing Sheets

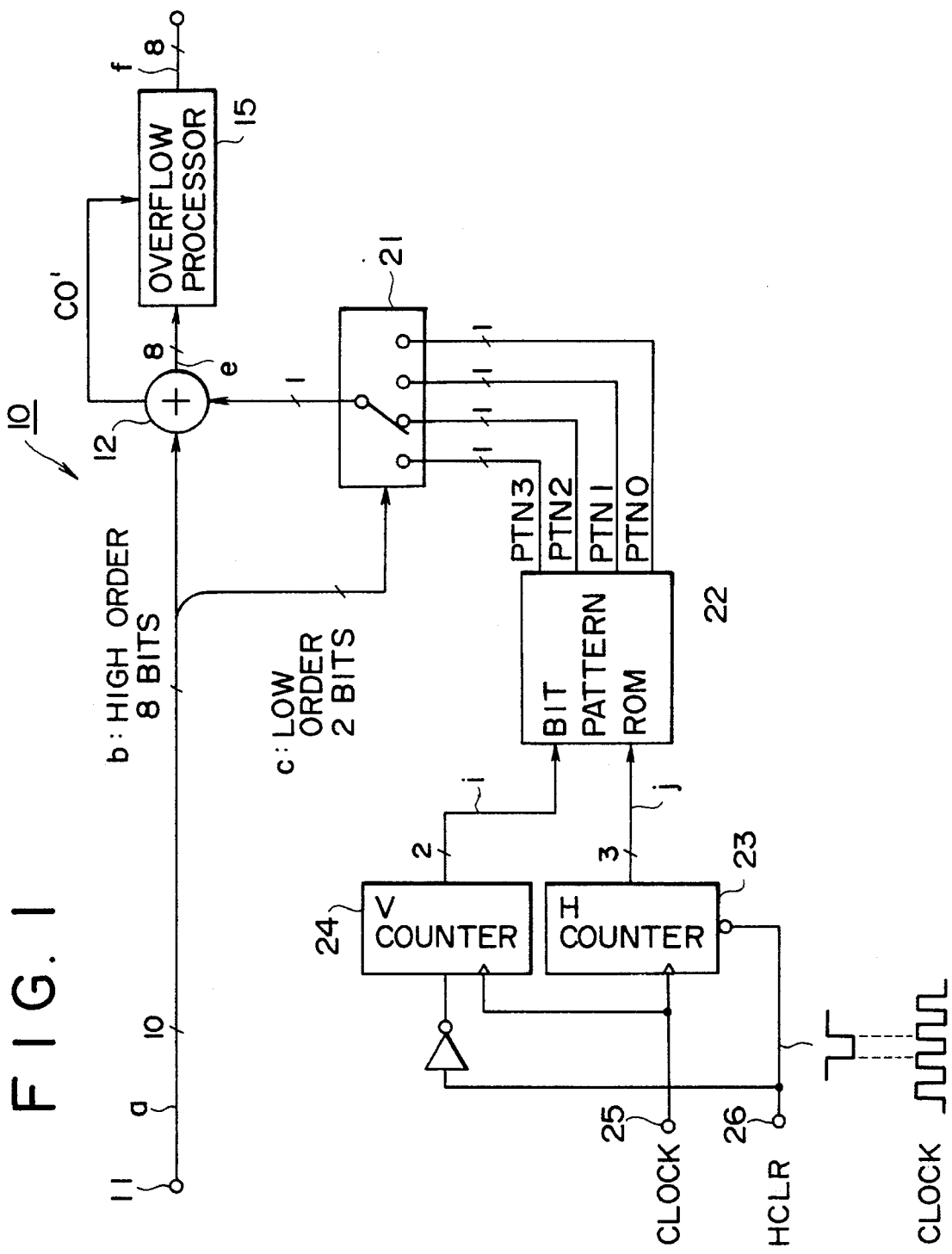

FIG. 2B  FIXED BIT PATTERNS

FIG. 2D  FIXED BIT PATTERNS

FIG. 3

```
                        7 0 1 2 3 4 5 6 7 0 1 2 3 4 5 6 7 0 1 2
            ⎧ LINE n    0 0 0 0 0 0 0 0 0 0 0 0 0 0 0 0 0 0 0 0   i = 0
  FIXED     | LINE n+1  0 0 0 0 0 0 0 0 0 0 0 0 0 0 0 0 0 0 0 0   i = 1
  BIT       | LINE n+2  0 0 0 0 0 0 0 0 0 0 0 0 0 0 0 0 0 0 0 0   i = 2
  PATTERN   | LINE n+3  0 0 0 0 0 0 0 0 0 0 0 0 0 0 0 0 0 0 0 0   i = 3
  PTN 0     ⎩ LINE n+4  0 0 0 0 0 0 0 0 0 0 0 0 0 0 0 0 0 0 0 0   i = 0
```

```
                        7 0 1 2 3 4 5 6 7 0 1 2 3 4 5 6 7 0 1 2
            ⎧ LINE n    0 ● 0 ● 0 0 0 0 ● 0 ● 0 0 0 0 0 ● 0 ● ●   i = 0
  FIXED     | LINE n+1  0 0 0 0 0 ● 0 ● 0 0 0 0 ● 0 ● 0 0 0 0 ●   i = 1
  BIT       | LINE n+2  0 ● 0 ● 0 0 0 0 0 ● 0 ● 0 0 0 0 0 ● 0 ●   i = 2
  PATTERN   | LINE n+3  ● 0 0 0 0 0 ● 0 ● 0 0 0 0 0 ● 0 ● 0 0 0   i = 3
  PTN 1     ⎩ LINE n+4  0 ● 0 ● 0 0 0 0 0 ● 0 ● 0 0 0 0 0 ● 0 ●   i = 0
```

```
                        7 0 1 2 3 4 5 6 7 0 1 2 3 4 5 6 7 0 1 2
            ⎧ LINE n    0 ● 0 ● 0 ● 0 ● 0 ● 0 ● 0 ● 0 ● 0 ● 0 ●   i = 0
  FIXED     | LINE n+1  ● 0 ● 0 ● 0 ● 0 ● 0 ● 0 ● 0 ● 0 ● 0 ● 0   i = 1
  BIT       | LINE n+2  0 ● 0 ● 0 ● 0 ● 0 ● 0 ● 0 ● 0 ● 0 ● 0 ●   i = 2
  PATTERN   | LINE n+3  ● 0 ● 0 ● 0 ● 0 ● 0 ● 0 ● 0 ● 0 ● 0 ● 0   i = 3
  PTN 2     ⎩ LINE n+4  0 ● 0 ● 0 ● 0 ● 0 ● 0 ● 0 ● 0 ● 0 ● 0 ●   i = 0
```

```
                        7 0 1 2 3 4 5 6 7 0 1 2 3 4 5 6 7 0 1 2
            ⎧ LINE n    ● 0 ● 0 ● ● ● ● 0 ● 0 ● ● ● ● ● 0 ● 0 ●   i = 0
  FIXED     | LINE n+1  ● ● ● ● 0 ● 0 ● ● ● ● 0 ● 0 ● ● ● ● ● ●   i = 1
  BIT       | LINE n+2  ● 0 ● 0 ● ● ● ● 0 ● 0 ● ● ● ● ● 0 ● 0 ●   i = 2
  PATTERN   | LINE n+3  0 ● ● ● ● 0 ● 0 ● ● ● ● 0 ● 0 ● ● ● ● ●   i = 3
  PTN 3     ⎩ LINE n+4  ● 0 ● 0 ● ● ● ● 0 ● 0 ● ● ● ● ● 0 ● 0 ●   i = 0
```

```
                  7 0 1 2 3 4 5 6 7 0 1 2 3 4 5 6 7 0 1 2
         ⎧ LINE n    O ● O O O ● O O O ● O O O ● O O O ● O O   i = 0
 FIXED   │ LINE n+1  O O O ● O O O ● O O ● O O O ● O O O ● O   i = 1
 BIT     │ LINE n+2  O O ● O O O ● O O O ● O O O ● O O O ● O   i = 2
 PATTERN │ LINE n+3  ● O O O ● O O O ● O O O ● O O O ● O O O   i = 3
 PTN 1'  ⎩ LINE n+4  O ● O O O ● O O O ● O O O ● O O O ● O O   i = 0

7 0 1 2 3 4 5 6 7 0 1 2 3 4 5 6 7 0 1 2
         ⎧ LINE n    ● O ● ● ● O ● ● ● O ● ● ● O ● ● ● O ● ●   i = 0
 FIXED   │ LINE n+1  ● ● ● O ● ● ● O ● ● O ● ● ● O ● ● ● O ●   i = 1
 BIT     │ LINE n+2  ● ● O ● ● ● O ● ● ● O ● ● ● O ● ● ● O ●   i = 2
 PATTERN │ LINE n+3  O ● ● ● O ● ● ● O ● ● ● O ● ● ● O ● ● ●   i = 3
 PTN 3'  ⎩ LINE n+4  ● O ● ● ● O ● ● ● O ● ● ● O ● ● ● O ● ●   i = 0
```

FIG. 7

| ROM (22) ADDRESS | | ROM (22) DATA | | | |
|---|---|---|---|---|---|
| i | j | PTN3 | PTN2 | PTN1 | PTN0 |
| 0  0 | 0 0 0 | 0 | 1 | 1 | 0 |
|      | 0 0 1 | 1 | 0 | 0 | 0 |
|      | 0 1 0 | 0 | 1 | 1 | 0 |
|      | 0 1 1 | 1 | 0 | 0 | 0 |
|      | 1 0 0 | 1 | 1 | 0 | 0 |
|      | 1 0 1 | 1 | 0 | 0 | 0 |
|      | 1 1 0 | 1 | 1 | 0 | 0 |
|      | 1 1 1 | 1 | 0 | 0 | 0 |
| 0  1 | 0 0 0 | 1 | 0 | 0 | 0 |
|      | 0 0 1 | 1 | 1 | 0 | 0 |
|      | 0 1 0 | 1 | 0 | 0 | 0 |
|      | 0 1 1 | 1 | 1 | 0 | 0 |
|      | 1 0 0 | 0 | 0 | 1 | 0 |
|      | 1 0 1 | 1 | 1 | 0 | 0 |
|      | 1 1 0 | 0 | 0 | 1 | 0 |
|      | 1 1 1 | 1 | 1 | 0 | 0 |
| 1  0 | 0 0 0 | 1 | 1 | 0 | 0 |
|      | 0 0 1 | 0 | 0 | 1 | 0 |
|      | 0 1 0 | 1 | 1 | 0 | 0 |
|      | 0 1 1 | 0 | 0 | 1 | 0 |
|      | 1 0 0 | 1 | 1 | 0 | 0 |
|      | 1 0 1 | 1 | 1 | 0 | 0 |
|      | 1 1 0 | 1 | 1 | 0 | 0 |
|      | 1 1 1 | 1 | 0 | 0 | 0 |
| 1  1 | 0 0 0 | 1 | 0 | 0 | 0 |
|      | 0 0 1 | 1 | 1 | 0 | 0 |
|      | 0 1 0 | 1 | 0 | 0 | 0 |
|      | 0 1 1 | 1 | 1 | 0 | 0 |
|      | 1 0 0 | 1 | 0 | 0 | 0 |
|      | 1 0 1 | 0 | 1 | 1 | 0 |
|      | 1 1 0 | 1 | 0 | 0 | 0 |
|      | 1 1 1 | 0 | 1 | 1 | 0 |

| INPUT | OUTPUT | OUTPUT IN BINARY FORMAT |
|---|---|---|
| $\geq +2$ | $-2$ | 1 0 |
| $+1$ | $+1$ | 0 1 |
| 0 | 0 | 0 0 |
| $-1$ | $-1$ | 1 1 |
| $\leq -2$ | $-2$ | 1 0 |

FIG. 11

| INPUT | | | | INPUT TO DETERMINATOR 48 | | | | BIT PATTERN | OUTPUT OF DETERMINATOR 48 | | |
|---|---|---|---|---|---|---|---|---|---|---|---|
| am | am-1 | am-2 | am-3 | am−am-1 | am-1−am-2 | am-2−am-3 | | | q | p D-1 | p D-2 |
| o | o | o | o | o | o | o | | PTN0 | o | o | o |
| o | o | o | – | o | o | – | | PTN1 | o | o | – |
| o | o | – | o | o | – | – | | PTN1 | o | o | – |
| o | o | – | – | o | – | o | | PTN1 | o | o | o |
| o | – | o | o | – | – | – | | PTN2 | o | – | o |
| o | – | o | – | – | – | – | | PTN3 | – | o | o |
| o | – | – | o | – | o | – | | PTN2 | o | o | – |
| o | – | – | – | – | o | o | | PTN3 | – | o | o |
| – | o | o | o | o | o | – | | PTN2 | o | – | – |
| – | o | o | – | o | o | o | | PTN3 | – | – | o |
| – | o | – | o | o | – | – | | PTN3 | – | – | – |
| – | o | – | – | o | – | o | | PTN0 | o | o | o |
| – | – | o | o | – | – | – | | – | o | o | o |
| – | – | o | – | – | – | – | | – | o | o | o |
| – | – | – | o | – | o | – | | – | o | o | o |
| – | – | – | – | – | o | o | | – | o | o | o |
| OTHER CONDITIONS | | | | -2 | * | * | | – | | | |
| | | | | * | -2 | * | | – | | | |
| | | | | * | * | -2 | | – | | | |
| | | | | OTHER THAN ABOVE COMBINATIONS | | | | – | | | |

* ... DON'T CARE
– ... BIT PATTERN CANNOT BE INFERRED

FIG. 20

| LOW-ORDER 2 BITS | RANDOM NOISE | CARRY OUT | CARRY OUT PROBABILITY |
|---|---|---|---|
| 0 0 | 0 0 | 0 | 0 / 4 |
| | 0 1 | 0 | |
| | 1 0 | 0 | |
| | 1 1 | 0 | |
| 0 1 | 0 0 | 0 | 1 / 4 |
| | 0 1 | 0 | |
| | 1 0 | 0 | |
| | 1 1 | 1 | |
| 1 0 | 0 0 | 0 | 2 / 4 |
| | 0 1 | 0 | |
| | 1 0 | 1 | |
| | 1 1 | 1 | |
| 1 1 | 0 0 | 0 | 3 / 4 |
| | 0 1 | 1 | |
| | 1 0 | 1 | |
| | 1 1 | 1 | |

DIGITAL DATA ROUNDING

BACKGROUND OF THE INVENTION

1. Field of the Invention

This invention relates to signal processing for rounding digital data and more particularly, but not exclusively, to the rounding of digital video data.

2. Description of the Prior Art

It often occurs that a video signal having a gentle slope, as shown in FIG. 17 of the accompanying drawings, is processed in a digital video apparatus as a video material. An example of such a video signal is one which serves as a graded background with a character signal or the like superimposed thereon.

In most cases, a video signal with a gentle slope used for such a purpose is quantized into eight-bit data as shown by a dashed line in FIG. 18 of the accompanying drawings. The video signal can also be quantized into ten-bit data as shown by a solid line in FIG. 18. It is clear from FIG. 18 that the quantization steps of the solid line are less pronounced than those of the dashed line. This is because ten-bit quantization is inherently better able to express gradation (by as much as four times) than that eight-bit quantization.

In view of this, the number of video materials quantized into ten-bit data has been increasing in recent years. In spite of this trend, most of contemporary video apparti for recording digital video signals are eight-bit digital VTRs. This situation is attributable to the fact that there is a limitation on the recording density of the video tape for recording the binary data '1's and '0's. This existing situation inevitably requires that the low-order two bits of a ten-bit digital video signal, which have been produced with much effort, be truncated when recording the signal into a digital VTR.

In a known recording technique for recording a ten-bit digital video signal by truncating the low-order two bits, the data undergoes rounding processing, i.e. the ten-bit data is converted into eight-bit one by performing rounding processing thereon. In this technique, random noise is used and a two-bit gradation is generated from the probability of generation of different levels of the random noise. A typical rounding-processing circuit 10 is shown in FIG. 19 of the accompanying drawings.

The circuit shown in FIG. 19 is used For carrying out rounding processing From ten to eight bits. First of all, a ten-bit digital video signal (a) input via a terminal 11 is split into data (b) comprising the high-order eight bits and data (c) comprising the low-order two bits. The low-order two-bit data (c) is then supplied to an adder 13 to be added to two-bit noise data (d) received from a random-noise generator 14.

Words of the two-bit noise data (d) that may be output by the random-noise generator 14 are '00', '01', '10' and '11'; each of these words are generated at a probability of ¼. Data produced by the adder 13 comprises 3 bits including a carry-out bit (CO).

As shown in FIG. 20 of the accompanying drawings, the probability of the carry-out bit (CO) being '1' corresponds to the magnitude of the low-order two-bit data (c) of the input ten-bit digital video signal (a). Accordingly, the carry-out bit (CO) is placed at the same bit position as the least significant bit of the high-order eight-bit data (b) of the input ten-bit digital video signal (a) and added to the high-order eight-bit data (b) by means of an adder 12.

In the case of an eight-bit adder 12, the addition is performed by supplying the high-order eight-bit data (b) to one of the input terminals thereof and all zeros to the other input terminal, the carry-out bit (CO) being red to a carry-input terminal of the adder 12.

In the addition of a high-order eight-bit data word (b) of all ones '11111111' and a carry-out bit (CO) of '1', the result overflows, outputting a '1' as its carry-out bit. In this case, the addition result (e) comprises nine bits. In order to prevent the rounding-processing circuit 10 from producing a result of nine bits, an overflow processing circuit 15 is used to carry out overflow processing and hence output a digital signal (f) comprising only eight bits.

The processing of the above signals is shown in FIGS. 21A–21D of the accompanying drawings. The operation of digital processing is in reality constrained to using numbers. However, for the sake of description simplicity, signal amplitudes are expressed as analog quantities in FIGS. 21A–21D.

A staircase waveform indicating a grading with ten-bit quantization is shown in FIG. 21A. Data to be added to the input digital video signal is shown in FIG. 21B. A staircase waveform indicating a grading with eight-bit quantization is shown in FIG. 21C. The same data as that shown in FIG. 21B to be added to the eight-bit digital video signal is shown in FIG. 21D.

The data shown in FIG. 21D is added to the signal to give the final output digital video signal (F) obtained from the rounding processing at a terminal 16 shown in FIG. 19. The effect of this rounding processing in which addition is performed is that for each ten-bit gradation, the corresponding truncated eight-bit level is raised to the next higher gradation level with a probability increasing in steps of 25%. FIGS. 21A–21D shows an example of the rounding processing for a staircase waveform starting at a level of 200.

When the output digital video signal (f) is converted into an analog signal and observed using a monitor, (not shown) the gradation of the low-order two bits of the ten-bit video signal can be recognized due to the integration effect of the sense of sight.

In the above rounding processing based on random noise, the screen of the monitor is also subject to noise, resulting in lower quality image. In addition, the Frequency band of the random noise may include a subcarrier frequency of the composite video signal. In such a case, unnecessary loci will appear when a video signal that has undergone the rounding processing is observed by means of a vectorscope. On top of that, there is, among other things, a problem that the eight-bit digital data resulting from the rounding processing cannot be restored to the original ten-bit digital data.

SUMMARY OF THE INVENTION

It is an object of the present invention to provide a rounding-processing technique that does not result in a lowering of image quality.

It is a further object of the present invention to provide a reversible data rounding-processing technique.

Viewed from one aspect, this invention provides apparatus for converting n-bit digital data to k bit digital data, where k<n, said apparatus comprising:

(i) pattern signal generating means for generating at least $2^{(n-k)}$ fixed pattern signals;

(ii) selecting means for selecting a particular fixed pattern signal from said $2^{(n-k)}$ fixed pattern signals according to value of one or more bits to be rounded; and (iii) adding means for adding said particular fixed pattern signal selected by said selecting means to an upper k significant bits of said n-bit digital data, whereby rounded k-bits of digital data are output from said adding means Viewed from another aspect, this invention provides apparatus for recovering n-bit digital data from rounded k-bit digital data, where said apparatus comprising:

(i) a difference means fop calculating a difference between current k-bit digital data and k-bit digital data preceding said current k-bit digital data by a predetermined period.

(ii) a plurality of consecutive delay means each for delaying said difference by said predetermined period; and (iii) a determinator for inferring truncated (n–k) bits from difference data input to and output from said delay means, wherein said (n–k) bits inferred by said determinator is used as recovered data to be concatenated as low order bits with said k bit digital data being recovered.

The above, and other objects, features and advantages of this invention will be apparent from the following detailed description of illustrative embodiments which is to be read in connection with the accompanying drawings.

BRIEF DESCRIPTION OF THE DRAWINGS

FIG. 1 shows a block diagram of a data rounding-processing circuit;

FIGS. 2A–2D show waveforms used for explaining rounding-processing operations;

FIG. 3 shows typical fixed bit patterns used in the rounding processing;

FIG. 4 shows fixed bit patterns used for comparison to those shown in FIG. 3;

FIG. 7 shows typical data stored in a bit pattern ROM;

FIG. 11 shows a table used for explaining operation of an example determinator;

FIG. 20 is a table showing a carry-out probability of the low-order two bits.

DESCRIPTION OF THE PREFERRED EMBODIMENTS

Figures 2A, 2C:
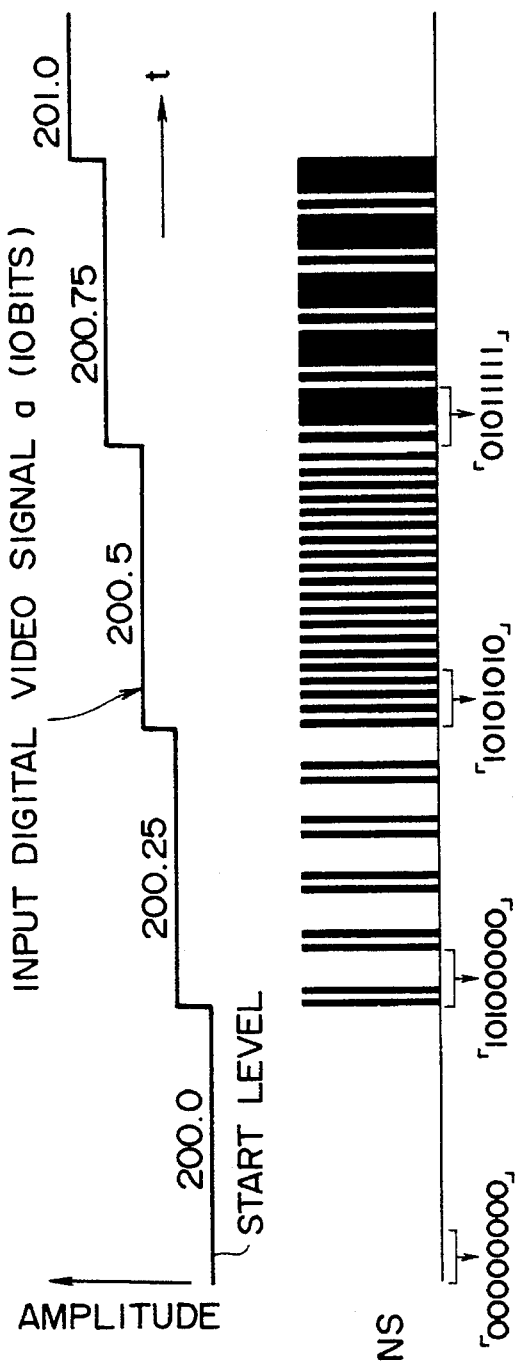

The description starts with embodiments as applied to a video signal without a chroma signal. Explanation of rounding processing of a video signal including a chroma signal and topics related thereto follows thereafter.

A block diagram of a typical rounding-processing circuit 10 provided by the invention is shown in FIG. 1. First of all, a digital video signal (a) is supplied to an input terminal 11. It should be noted that the input digital video signal (a) has already been quantized into ten-bit data. Generally speaking, however, the number of quantization bits n does not have to be ten.

The ten-bit digital video signal (a) is then split into high-order eight-bit data (b) and low-order two-bit data (c). The high-order eight-bit data (b) is supplied to an adder 12 and the low-order two-bit data (c) is fed to a selector 21 as a control signal thereof.

The selector 21 is used for selecting a fixed bit pattern (data), to be used in the rounding processing, in accordance with the value of the low-order two-bit data (c). The fixed bit pattern is a bit pattern for expressing the gradation of (n–k) bits in the rounding processing, where n is the number of bits input to the rounding processing and k is the number of bits output by the rounding processing. The fixed bit pattern is created by taking a minimum of (n–k) single-bit samples one after another. As many fixed bit patterns as $2^{(n-k)}$ are provided. In the rounding processing of 10 to 8 bits, for example, the number of fixed bit patterns is therefore four.

As will be described later, each fixed bit pattern comprises eight single-bit samples instead of two single-bit samples (n–k=2). Let notations PTN0, PTN1, PTN2 and PTN3 denote the four fixed bit patterns. The bit-pattern data is stored in a bit-pattern ROM 22. Details of the data stored in the bit-pattern ROM 22 will be described later.

The address fed to the bit pattern ROM 22 comprises fields j and i, the values of which are set by outputs of H and V counters 23 and 24 respectively. The H counter is cleared once for each horizontal scanning period whereas the V counter is incremented by one for every horizontal scanning period.

A sampling clock signal CLOCK for the input digital video signal is also used as a clock signal driving the H counter 23. A pulse HCLR having a width equal to one clock period, as shown in FIG. 1, is generated periodically for each horizontal scanning period as a clear pulse resetting the H counter 23.

Likewise, the sampling clock signal CLOCK for the input digital video signal is also used as a clock signal driving the V counter 24. The inverse of the clear pulse HCLR is supplied to the EN pin of the V counter 24 as an enable pulse which allows the V counter to be incremented by one for each horizontal scanning period.

A fixed bit pattern selected by the selector 21 is supplied to an adder 12 to be added to the high-order eight-bit data (b) of the input digital video signal.

An overflow processing circuit 15 operates in the same way as the one described earlier. To be more specific, overflow processing is carried out when a carry out CO is output by the adder 12. After undergoing the overflow processing, the eight-bit digital video signal output by the adder 12 is used as the final digital video signal.

When the eight-bit digital video signal which has undergone the rounding processing is converted into an analog signal to be observed using a monitor, a gradation of the low-order two bits close to that of the original ten-bit video can be seen due to the integration effect of the sense of sight.

Waveforms of signals appearing at a variety of points in FIG. 1 are shown in FIGS. 2A–2D. A ten-bit input digital video signal expressed in terms of analog quantities is shown in FIG. 2A. As shown, the start level of the signal is set at 200.0.

Examples of fixed bit patterns selected by the selector 21 in accordance with the low-order two-bit data (c) '00', '01', '10' and '11' are shown in FIG. 2B.

When the low-order two-bit data (c) has a value of '00', for example, a fixed bit pattern '00000000' is selected. For other values of the low-order two-bit data (c), the following fixed bit patterns are selected:

| Low-order 2 bits | Fixed bit patterns |
| --- | --- |
| 01 | 10100000 |
| 10 | 10101010 |
| 11 | 01011111 |

The average value of a fixed bit pattern represents the gradation of the low-order two bits associated with that fixed bit pattern. When the low-order two bits have a value of '11', for example, the selected fixed bit pattern is '01011111' which has an average value (0+1+0+1+1+1+1+1)/8=¾. Therefore, the gradation of the low-order two bits '11' is ¾.

The high-order eight-bit data (b) of the ten-bit input digital video signal (a) expressed in terms of analog quantities is shown in FIG. 2C. FIG. 2D is the fixed bit patterns to be added to the high-order eight-bit data (b) shown in FIG. 2C.

Assuming that the intensity of a video picture displayed on the monitor is uniform throughout the entire screen and that the input level at that time is 200.25, then the low-order two bits corresponding to this input level will be '01', which represents the fraction part 0.25. As described above, the fixed bit pattern selected by the selector 21 is '10100000'. The fixed bit pattern comprising these eight single-bit samples is taken a number of times during each horizontal scanning period. Accordingly, the fixed bit pattern is repeated a number of times in a horizontal scanning period to form a horizontal bit pattern. The horizontal bit pattern is repeated a number of times during a vertical scanning period.

In this way, the positions of the fixed-bit pattern samples '1' are aligned in the vertical direction and a vertical bit pattern may undesirably be recognized. Efforts must thus be made to prevent the same horizontal bit pattern from appearing twice in a row on two consecutive lines of a vertical scanning period in order to avoid such an all-one vertical bit pattern. Therefore, the same arrangement of the eight single-bit samples constituting a fixed bit pattern is repeated at x-line intervals, where x is $2^{(n-k)}$. In this example, the value of x is four which means that a fixed bit pattern is repeated at four-line intervals. In other words, four arrangements of the eight single-bit samples associated with each fixed bit pattern or each piece of the low-order two-bit data are required. Actual examples of generation of fixed bit patterns are shown in FIG. 3.

As described above, the fixed bit patterns PTN0, PTN1, PTN2 and PTN3 are selected to represent the low-order two-bit data '00', '01', '10' and '11' respectively.

The fixed bit pattern PTN1 is described in more detail as follows. In addition to the base fixed bit pattern (or the base arrangement of the eight single-bit samples) '10100000', three other arrangements of single-bit samples '00001010', '01010000' and '00000101' are provided. The other three arrangements of single-bit samples are obtained by merely rearranging the eight single-bit samples constituting the base fixed bit pattern. In this way, the same horizontal bit pattern can be prevented from appearing twice in a row on two consecutive lines. By appropriately taking a total of four different arrangements of eight single-bit samples for each piece of the low-order two-bit data on a selection basis as shown in FIG. 3, an undesirable specific fixed bit pattern becomes difficult to recognize.

As shown in FIG. 3, the fixed bit pattern PTN0 has only one arrangement of the eight single-bit samples: '00000000'. Much like PTN1, however, the fixed bit pattern PTN3 has three other arrangements of eight single-bit samples in addition to the basic one. The other arrangements are obtained by merely reordering the sample bit '1' to give a total of four. In the case of the fixed bit pattern PTN2, there are two ways of arranging the eight single-bit samples: '10101010' and '01010101'.

Each of the fixed bit patterns PTN0, PTN1, PTN2 and PTN3 has up to four arrangements of its eight single-bit samples which can all be taken during a bit pattern generation sequence comprising no more than four horizontal scanning periods. The bit pattern generation sequence comprising four horizontal scanning periods can be implemented by using the signal (i) output by the V counter as shown in FIG. 1. As described above, a fixed bit pattern is a sequence of eight single-bit samples which can be generated consecutively by using the signal (j) output by the H counter 23.

It should be noted that, basically, two-bit gradation can be obtained by using only four single-bit samples. In spite of that, eight single-bit samples are in fact deliberately used as described above because of a reason explained as follows.

An example in which a fixed bit pattern is generated as a sequence of four consecutive single-bit samples is shown in FIG. 4. In this example, a fixed bit pattern PTN1' '1000' is used for expressing a gradation of 0.25 whereas a fixed bit pattern PTN3' '0111' is used for expressing a gradation of 0.75.

Figure 5:
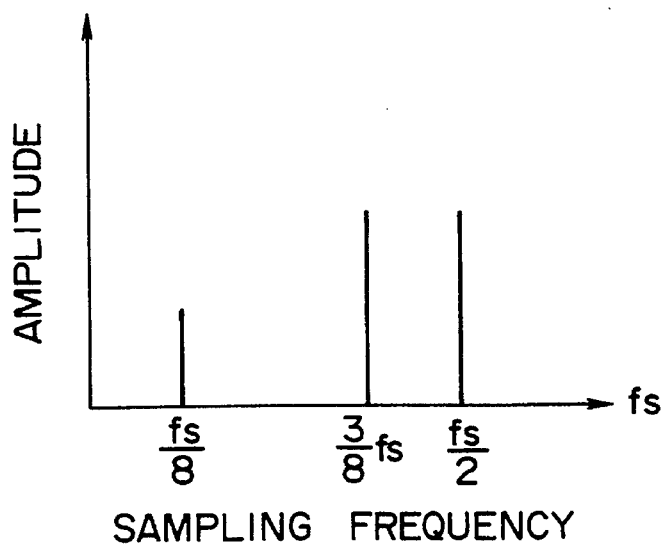
FIG. 5 shows a frequency spectrum of some fixed bit patterns shown in FIG. 3.
Figure 6:
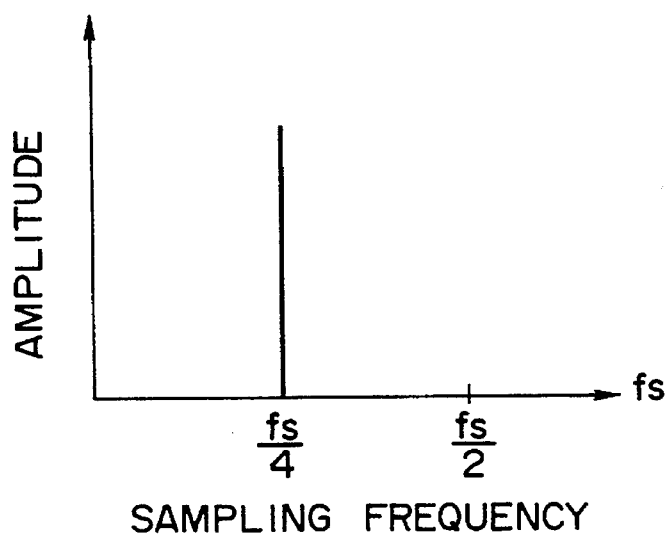
FIG. 6 shows a frequency spectrum of some fixed bit patterns shown in FIG. 4.

A frequency spectrum of the fixed bit patterns each implemented as a sequence of eight consecutive single-bit samples is shown in FIG. 5. As shown, the frequency spectrum comprises three components. On the other hand, a frequency spectrum of the fixed bit patterns each implemented as a sequence of four consecutive single-bit samples is shown in FIG. 6. As shown, the frequency spectrum comprises only one component.

With a sampling frequency fs made equal to 4 fsc, where fsc is a subcarrier frequency having a value of 3.58 MHz, for digital composite video signal, the relation fs/4=fsc holds true. Accordingly, the component of the spectrum of the four-sample sequences is located at a frequency equal to the subcarrier frequency fsc. As a result, when pounding processing is carried out by using four-sample sequences, the resulting picture will be displayed on the screen of a monitor with rounding-processed portions thereof exhibiting a pale colour. For this reason, the present invention adopts fixed bit patterns each implemented as an eight-sample sequence instead of a four-sample sequence.

In the case of a digital component video signal, the sampling frequency is normally 13.5 MHz. Therefore, the frequency-spectrum component generated at the frequency fs/4 causes no problems due to the use of a digital component video signal. However, when the digital component video signal is converted, using a system converter, into a digital composite video signal, the sampling frequency for the conversion is equal to fs/4=3.38 Mhz which inadvertently becomes close to the subcarrier frequency fsc.

For the reasons described above, it is therefore desirable to adopt fixed bit patterns that can prevent a frequency-spectrum component from being generated at the frequency fs/4 for both the digital component video signal and the digital composite video signal. Typical ROM data for generating the desirable fixed bit patterns is shown in FIG. 7.

Figures 9, 10:
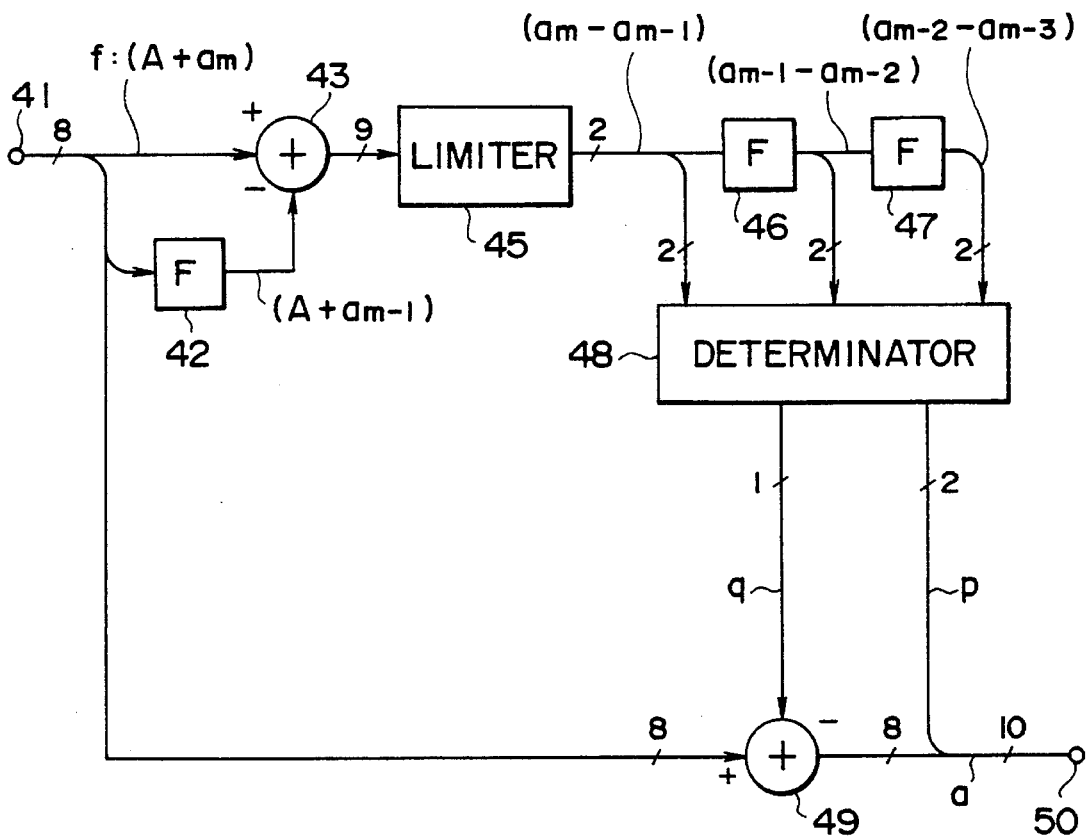
FIG. 9 shows a data restoring circuit.
FIG. 10 shows a table of relation between inputs and outputs of a limiter 54.

An embodiment for implementing data restoring processing is shown in FIG. 9. The embodiment is used for restoring data which has undergone rounding processing from 10 bits to 8 bits. It should be noted that the restoration is limited to static regions. In other words, the restoration can be applied only to a stationary image and is thus not applicable to a moving video picture.

First of all, a fixed bit pattern comprising a basic arrangement and other rearranged sequences is taken during four consecutive horizontal scanning periods and repeated at four-period intervals as is described earlier. One frame of a video picture comprises 525 and 625 horizontal scanning lines for the NTSC and PAL systems respectively. The values 525 and 625 can each be expressed by a formula (a multiple of 4+1). That is to say, 525 is equal to 131×4+1, whereas 625 is equal to 156×4+1.

Figure 8:
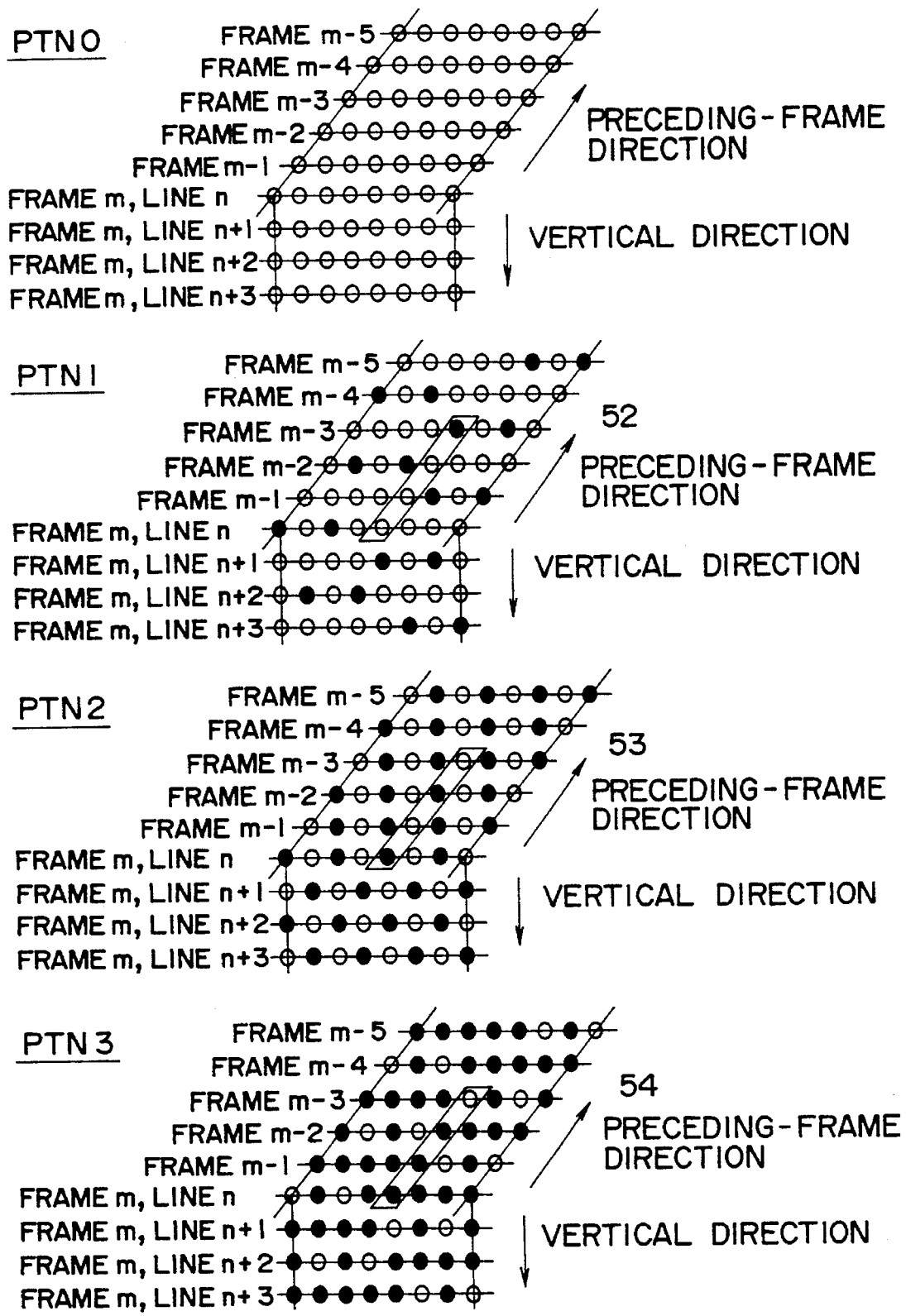
FIG. 8 shows typical changes in fixed bit pattern from frame to frame.

The significance of these numbers is explained by referring to FIG. 8. Let the fixed bit pattern PTN1 be taken for line n of frame m and have the sample arrangement '10100000'.

In this case, the sample arrangements of the fixed bit pattern PTN1 for the preceding frames are listed as follows:

Frame m—'10100000' as described above.

Frame m-1—'00000101'

Frame m-2—'01010000'

Frame m-3—'00001010'

Frame m-4—'10100000'.

It is obvious from the above list that a sample arrangement of the fixed bit pattern PTN1 is repeated at four-frame intervals. As a result, a picture is integrated in three directions: the vertical, horizontal and frame directions. The above description correspondingly applies to the other fixed bit patterns PTN0, PTN2 and PTN3.

A data restoring circuit is designed by taking the repetition described above into consideration. A typical data restoring circuit for restoring eight-bit data of a digital video signal to the original ten-bit digital video signal is shown in FIG. 9.

An eight-bit digital video signal is the sum of video data of a static picture of a frame m and an eight-sample repetitive fixed bit pattern am. The video data of a static picture is denoted hereafter by notation A. The four preceding frames are expressed as follows:

Frame m—A+am as described above

Frame m-1—A+am-1

Frame m-2—A+am-2

Frame m-3—A+am-3

Frame m-3—A+am-4

As shown in FIG. 9, the difference between an input eight-bit digital video signal (A+am) and an eight-bit digital video signal (A+am-1) delayed by a frame period by means of a frame delay circuit 42 is calculated by a subtractor 43. The result of subtraction of an eight-bit data from another eight-bit data extends to nine bits which are truncated to two bits by a limiter 45.

A table of relation between inputs and outputs of the limiter 45 and the binary format for the outputs is shown in FIG. 10. As shown in the table of FIG. 10, inputs with values of greater than +1 and smaller than −1 are converted into the same output which is −2 in this case. The binary format shown in the table is the two's complementary expression.

The output of the limiter 45 is delayed by a frame by means of a frame delay circuit 46. Similarly, the output of the frame delay circuit 46 is then delayed by a frame by means of a frame delay circuit 47. The outputs of the limiter 45 and the frame delay circuits 46 and 47 are concatenated with each other to form a six-bit signal to be supplied to a determinator 48. Here, the output of the limiter is (am−(am-1)), the outputs of the frame delay circuits 46 and 47 are ((am-1)−(am-2)) and ((am-2)−(am-3)) respectively.

The determinator 48 generates a three-bit determination output signal. Two (p) of the three bits are the low-order two bits of the ten-bit signal being recovered. The remaining one bit (q) is the amplitude (am) of the fixed-bit pattern component of the eight-bit input digital video signal (A+am). It should be noted that the magnitude of the amplitude am is either 0 or 1 which can thus be represented by the one-bit data (q).

A subtracter 49 subtracts am from (A+am) to eliminate am and produce A, the high-order eight bits of the ten-bit data. The two bits (q) are then concatenated with the high-order eight bits (A) on the low-order side thereof to produce a recovered ten-bit digital video signal at a terminal 50.

Next, the principle of operation of the determinator 48 mentioned above is described. A table of relation between bit patterns of the values 0 and 1 of am, am-1, am-2 and am-3 and the differences (am−(am-1)), ((am-1)−(am-2)) and ((am-2)−(am-3)) is shown in FIG. 11.

In the case of a video signal conveying a static picture, it is sufficient to consider only cases in which the amplitudes (am, am-1, am-2, am-3) are (0, 0, 0, 0) to (1, 1, 1, 1). This is because the amplitude of a fixed bit pattern is either 0 or 1. As for a motion video picture, on the other hand, it will be sufficient to consider that am, am-1, am-2 and am-3 may have an amplitude of greater than 2.

If the value of (am−(am-1)), ((am-1)−(am-2)) or ((am-2)−(am-3)) supplied to the determinator 48 is greater than +1 or smaller than −1, the limiter 45 outputs a value of −2. A value of (am−(am-1)), ((am-1)−(am-2)) or ((am-2)−(am-3)) greater than +1 or smaller than −1 is categorized as "Other conditions" on the leftmost column of the table shown in FIG. 11 which shows the bit patterns of the values 0 and 1 of am, (am-1, (am-2) and (am-3). In this case, the value of one of (am−(am-1)), ((am-1)−(am-2)) or ((am-2)−(am-B)) is −2.

The determinator 48 can infer which of the bit patterns PTN0, PTN1, PTN2 and PTN3 was used in the rounding processing from the bit pattern of the six bits of (am−(am-1)), ((am-1)−(am-2)) and ((am-2)−(am-3)). The inference is explained by giving actual examples as follows.

If {(am−(am-1)), ((am-1)−(am-2)) or ((am-2)−(am-3))} is {0, 0, −1}, then {am, (am-1), (am-2) and (am-3)} is {0, 0, 0, 1} which is generated by a fixed bit pattern corresponding to a sample block frame 52 shown in FIG. 8. Accordingly, the fixed bit pattern used in the rounding processing is PTN1. The low-order two bits associated with the fixed bit pattern PTN1 are:

(D0, D1)=(0, 1)

In this case, the determinator 48 also outputs 0 as the value of the amplitude of the fixed bit pattern am as well.

Another example is given below.

If {(am−(am-1)), ((am-1)−(am-2)) or ((am-2)−(am-3))} is {1, −1, 1}, then {am, (am-1), (am-2) and (am-3)} is {1, 0, 1, 0} which is generated by a fixed bit pattern corresponding to a sample block frame 53 shown in FIG. 8. Accordingly, the fixed bit pattern used in the rounding processing is PTN2. The low-order two bits associated with the fixed bit pattern PTN2 are:

(D0, D1)=(1, 0)

In this case, the determinator 48 also outputs 1 as the value of the amplitude of the fixed bit pattern am as well.

One more example is given below.

If {(am−(am-1)), ((am-1)−(am-2)) or ((am-2)−(am-3))} is {0, 0, 1}, then {am, (am-1), (am-2) and (am-3)} is {1, 1, 1, 0} which is generated by a fixed bit pattern corresponding to a sample block frame 54 shown in FIG. 8. Accordingly, the fixed bit pattern used in the founding processing is PTN3. The low-order two bits associated with the fixed bit pattern PTN3 are:

(D0, D1)=(1, 1)

In this case, the determinator 48 also outputs 1 as the value of the amplitude of the fixed bit pattern am as well.

When a fixed bit pattern cannot be inferred from the bit pattern of the six bits of (am, am-1, am-2 and am-3), the determinator 48 sets all the three output bits at zero used fop recovering the ten-bit digital video signal. Such processing occurs in a motion video region. A bit pattern of six bits of (am, am-1, am-2 and am-3) from which a fixed bit pattern cannot be inferred is indicated by the notation "−" on the bit-pattern column.

The embodiments described above implement the rounding and restoring processes for a video signal comprising only an intensity signal. An example of such a video signal is a digital composite video signal which comprises an intensity signal having a gentle slope with a subcarrier superimposed thereon. The rounding and restoring processing of such a digital composite video signal is described as follows.

Figure 12:
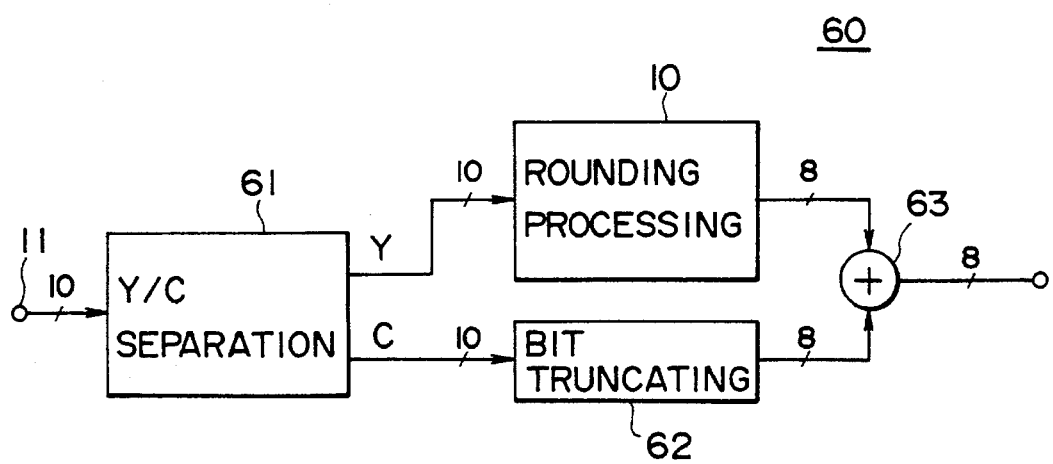
FIG. 12 shows a block diagram of another data-rounding processing circuit.

A typical rounding-processing circuit for a digital composite video signal is shown in FIG. 12. In this rounding-processing circuit, a ten-bit input digital composite video signal is split by a Y/C separation circuit 61 into an intensity signal (Y) and a chroma (chrominance) signal (C).

The intensity signal (Y) separated from the chroma signal (C) undergoes the same founding processing as the one described above. The ten-bit intensity signal (Y) is rounded to eight bits using a rounding-processing means equivalent to the data founding-processing circuit shown in FIG. 1. As fop the chroma signal (C), a two-bit truncating circuit 62 is used fop truncating the low-order two bits out of the ten-bit digital data. The truncating circuit 62 produces eight-bit digital data which is then synthesized with the rounded eight-bit intensity signal by a synthesizer 63.

Figure 13:
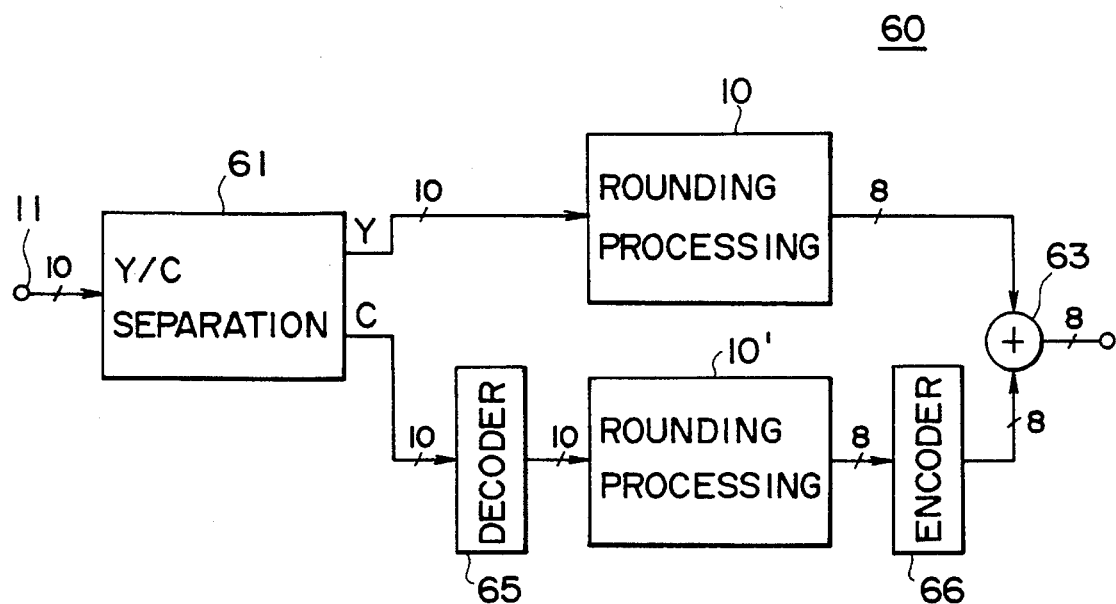
FIG. 13 shows a block diagram of still another data rounding-processing circuit.

When it is desired to carry out rounding processing also on the chroma signal (C), the chroma signal (C) is first brought to a base band by means of a decoder 65, as shown in FIG. 13, prior to the rounding processing. After the rounding processing, the chroma signal (C) is again encoded with a subcarrier by means of an encoder 66. Reference numeral 10' is a rounding-processing means for the chroma signal (C). It should be noted that the rounding-processing means 10' has the same configuration as the data pounding-processing circuit shown in FIG. 1.

Figure 14:
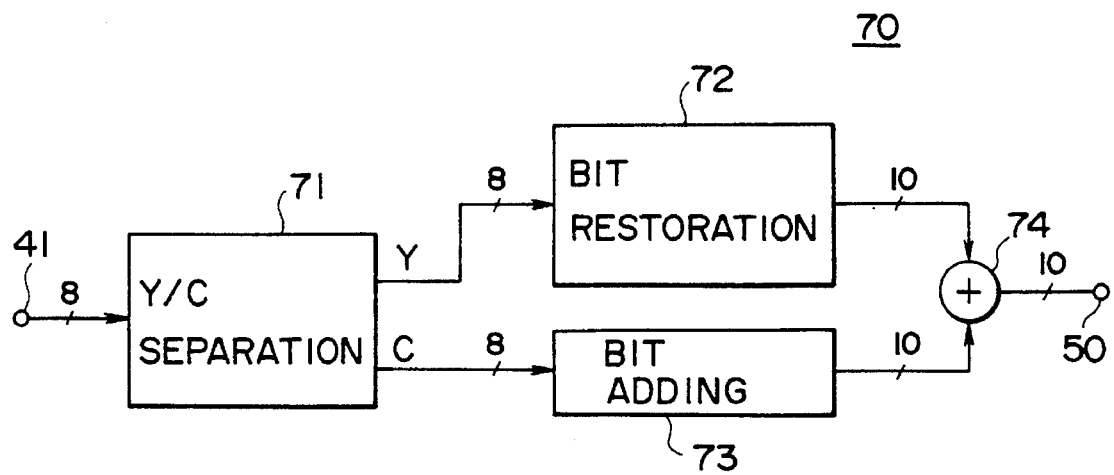
FIG. 14 shows a block diagram of a data restoring circuit.

An embodiment implementing a data restoring circuit 70 is shown in FIG. 14. The embodiment shown in FIG. 14 corresponds to the data restoring circuit shown in FIG. 9.

An eight-bit composite video signal which has experienced rounding processing is supplied to a terminal 41 and then split by means of a Y/C separation circuit 71 into an intensity signal (Y) and a chroma signal (C). The intensity signal (Y) is restored to a ten-bit intensity signal (Y) by a bit recovering means 72. The data restoring circuit 40 described above is used as the bit recovering means 72.

The chroma signal (C) is supplied to a bit adding circuit 73 at which two bits '00' are appended unconditionally to the chroma signal (C) on the low-order-bit side to produce a ten-bit chroma signal (C). A ten-bit digital composite video signal is recovered by synthesizing the ten-bit chroma signal (C) and the ten-bit intensity signal (Y) using a synthesizer 74.

In this case, it is necessary to somewhat revise the Y/C separation circuit 71 cited above. As described above, the frequency spectrum of the fixed bit patterns used in the rounding processing is shown in FIG. 5.

Figure 15:
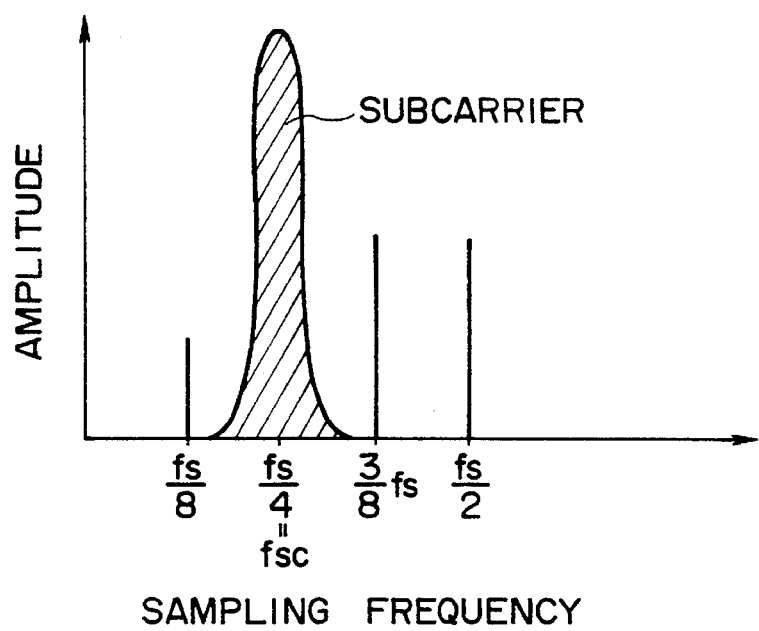
FIG. 15 shows a relation between the spectrum of fixed bit patterns and a subcarrier.

As shown in the figure, the spectrum is spread around (fs/4=3.58 Mhz), the frequency of the subcarrier. It is thus necessary to use a filter having a characteristic shown in FIG. 15 in order to separate components in the subcarrier band.

Figure 16:
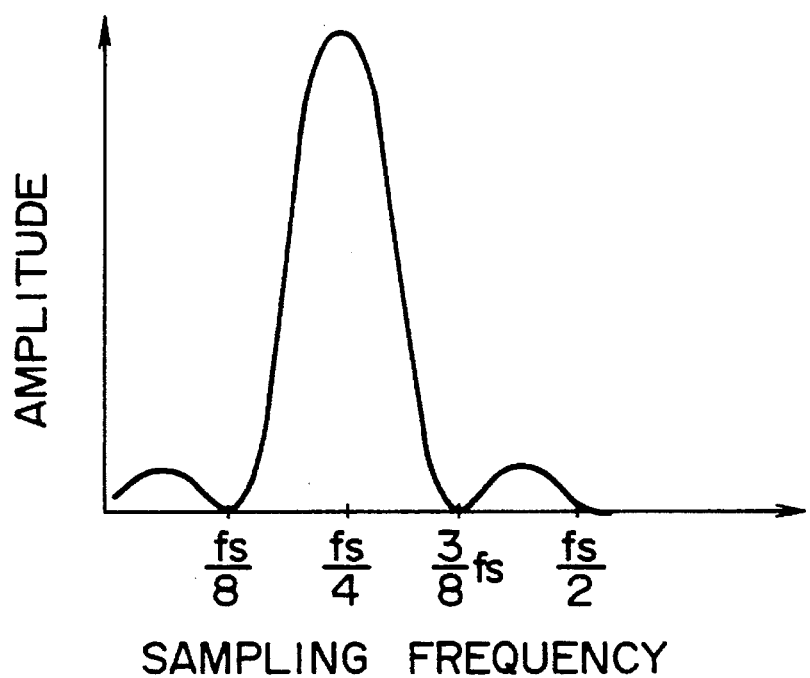
FIG. 16 shows the characteristic of a filter for filtering a subcarrier.
Figure 17:
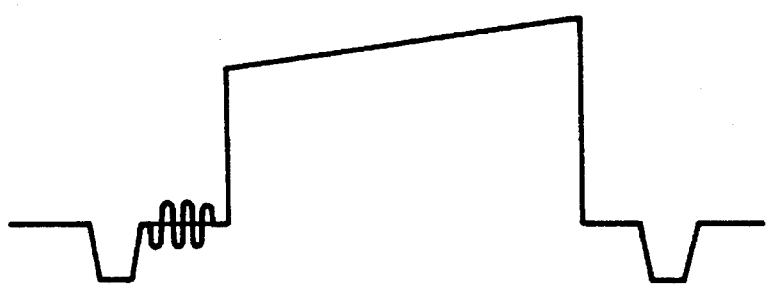
FIG. 17 shows a typical waveform of a video signal.
Figure 18:
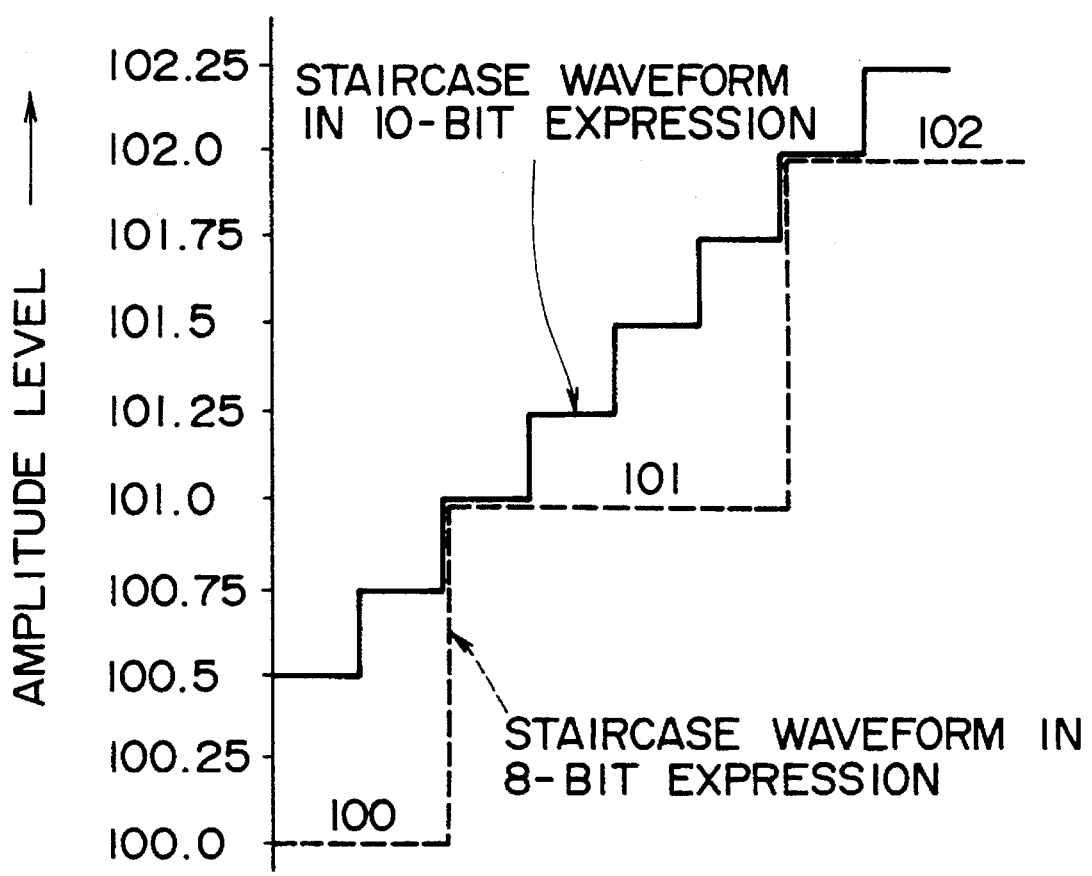
FIG. 18 shows a difference in degradation between two techniques of quantization.
Figure 19:
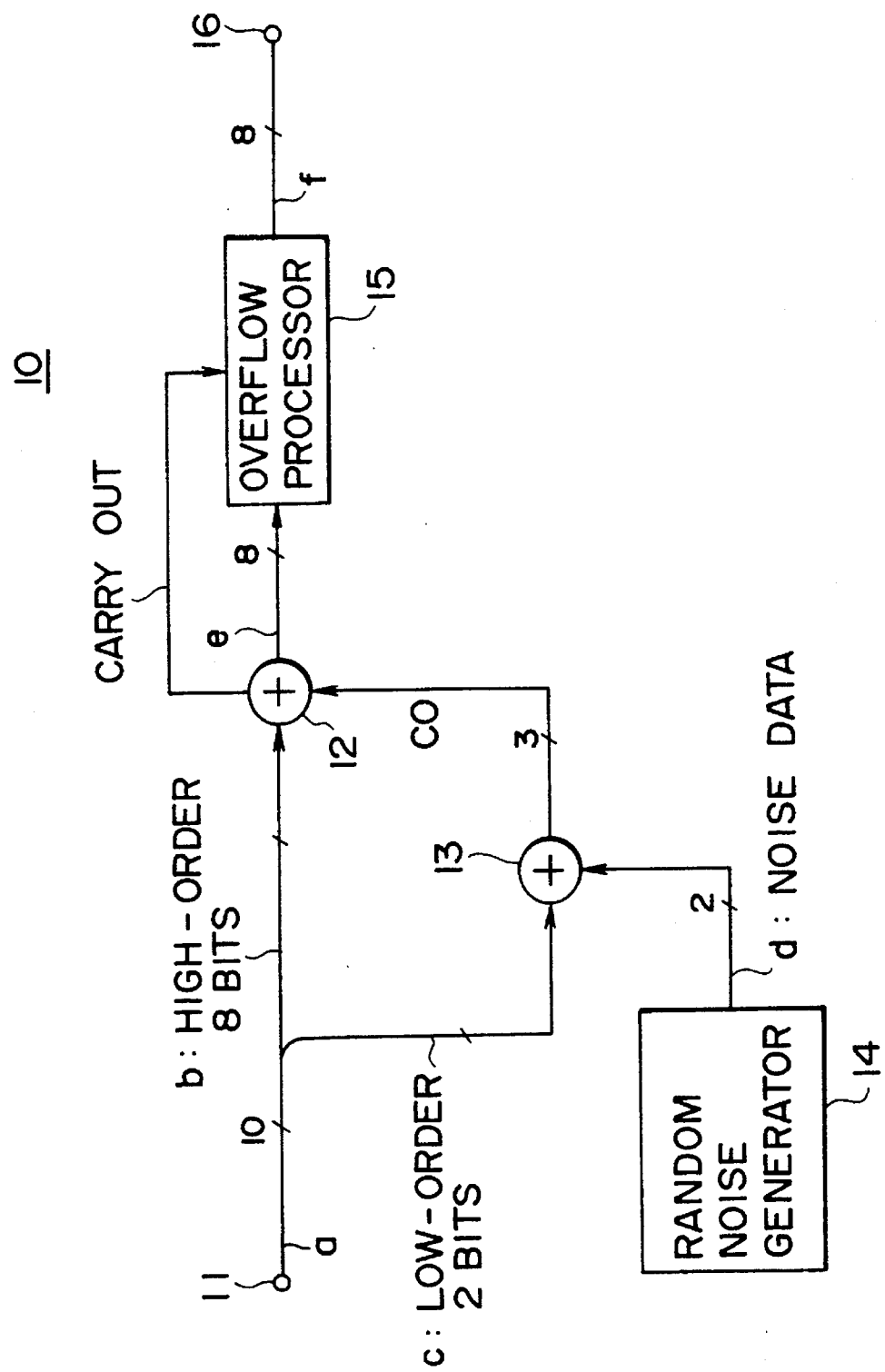
FIG. 19 shows a block diagram of a known data rounding-processing circuit.
Figures 21A, 21B, 21C, 21D:
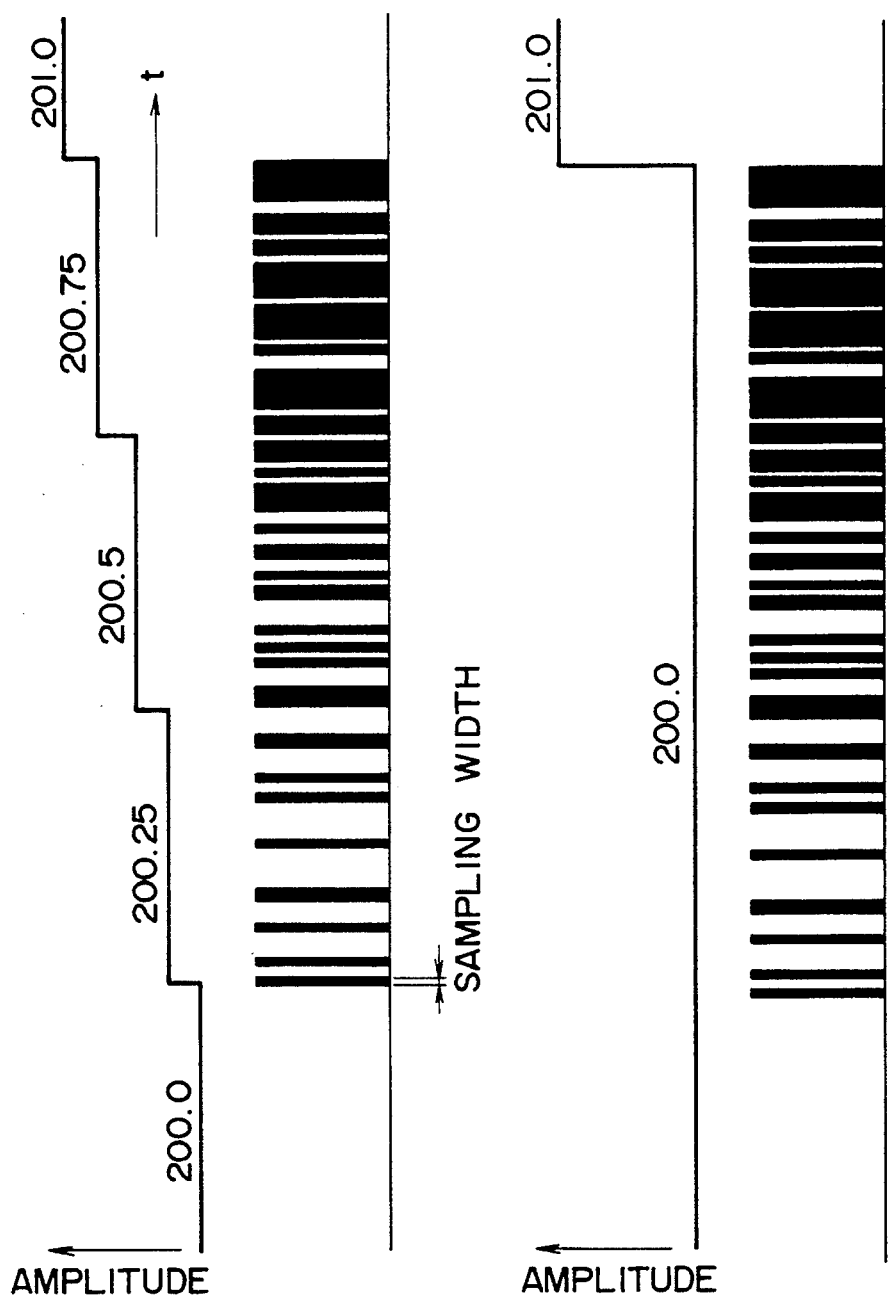
FIGS. 21A–21D are diagrams used for explaining the operation of rounding processing.

To be more specific, the filter has such a characteristic that components of the frequency bands fs/8, 3 fs/8 and fs/2 are not passed. As shown in FIG. 5, the frequency bands Fs/8, 3 fs/8 and fs/2 are frequency bands in which the spectrum elements actually exist. Such a characteristic can be implemented by typically an FIR-type digital filter, the characteristic of which is shown in FIG. 16.

The characteristic of a digital filter that can be given as an example is expressed in a Z-transform format as follows:

$$F(Z)=(1-Z^{-2})^2 \cdot (1+Z^{-4})^2$$

By directly controlling a bit pattern ROM 22 shown in FIG. 1 using the low-order two-bit data (c), the selector 21 controlled by the low-order two-bit data (c) can be eliminated.

It should be noted that the embodiments that have been described are merely for making the present invention more apparent. In particular, the embodiments by no means define the number of bits or impose limitation on the fixed bit pattern.

In summary, in the rounding processing of data, fixed bit patterns PTN0, PTN1, PTN2 and PTN3 ape each used repeatedly. In each cycle, eight single-bit samples as shown in FIG. 7 are taken one after another for generating a fixed bit pattern. The fixed bit patterns PTN0, PTN1, PTN2 and PTN3 are prepared in advance and are selected in accordance with the number of bits to undergo the rounding processing. To be mope specific, one of the fixed bit patterns, PTN0, PTN1, PTN2 and PTN3 is selected in accordance with the value of the low-order two-bit data (c) of the input shown in FIG. 1. The selected fixed bit pattern is added to the high-order eight-bit data (b) of the input. The result of addition undergoes limiter processing and is then used as an output digital video signal completing the founding processing.

In the restoring processing of data, two bits of data are recovered by referencing pieces of input difference data output by frame delay circuits 46 and 47 shown in FIG. 9. By appending the recovered data as the low-order 2 bits to the eight-bit data (b) of the input, the original ten-bit digital data can be recovered.

By carrying out the founding and restoring processing of data described above, an analog signal with a quality close to that of ten-bit data can be obtained when converting eight-bit digital data output by an eight-bit digital VTR into an analog signal.

As described above, the data-rounding processing circuit provided by the present invention uses fixed bit patterns. Accordingly, the screen does not become noisy due to the rounding processing and the fixed bit patterns in use ape not processed as a pseudo chroma signal either. As a result, the picture quality is improved.

In addition, the fixed bit pattern being used in the rounding processing may be inferred from frame differences to recover the original bits. A data restoring circuit is provided with which at least the number of bits of a static picture can be recovered to its original value.

The present invention is particularly applicable to a data processing system of a digital VTR.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for converting n-bit digital data to k-bit digital data, where k<n, said apparatus comprising:

pattern signal generating means for generating at least $2^{(n-k)}$ fixed pattern signals independently of said n-bit digital data;

selecting means for selecting a particular fixed pattern signal from said $2^{(n-k)}$ fixed pattern signals according to a value of (n–k) least significant bits to be dropped; and adding means for adding said particular fixed pattern signal selected by said selecting means to an upper k significant bits of said n-bit digital data, whereby rounded k bits of digital data are output from said adding means.

2. Apparatus according to claim 1, wherein said n-bit digital data is image data for display as rastered lines of image data.

3. Apparatus according to claim 2, wherein bit arrangements of said fixed pattern signals are changed with each rastered line of image data.

4. Apparatus according to claim 3, wherein said fixed pattern signals change with a period of $2^{(n-k)}$.

5. Apparatus according to claim 1, wherein said n-bit digital data is 10-bit digital video data and said rounded k bits of digital data is 8-bit digital video data.

6. Apparatus according to claim 1, wherein said fixed pattern signals each comprise a repeating pattern of at least $2^{(n-k)}$ bits.

7. Apparatus according to claim 6, wherein said repeating pattern comprises $2^{(n-k+1)}$ bits.

8. Apparatus for recovering n-bit digital data from rounded k-bit digital data, where k<n, said apparatus comprising:

difference means for calculating a difference between current k-bit digital data and k-bit digital data preceding said current k-bit digital data by a predetermined period;

a plurality of consecutive delay means each for delaying said difference by said predetermined period; and determinator means for inferring (n–k)-bit truncated data using said current calculated difference and delayed difference data output by said plurality of consecutive delay means, wherein said (n–k)-bit truncated data inferred by said determinator means is used as recovered data to be concatenated as low order bits with said k-bit digital data to form said recovered n-bit digital data.

9. Apparatus according to claim 8, wherein said determinator means outputs one-bit data used in rounding processing and (n–k)-bit recovery data used for data recovery.

10. Apparatus according to claim 8, wherein said one-bit data used in said rounding processing is subtracted from said k-bit digital data being recovered.

11. Apparatus according to claim 8, wherein said predetermined period is a frame period of a rastered image.

12. A method of converting n-bit digital data to k-bit digital data, where k<n, said method comprising the steps of:

generating at least $2^{(n-k)}$ fixed pattern signals independently of said n-bit digital data;

selecting a particular fixed pattern signal from said $2^{(n-k)}$ fixed pattern signals according to a value of (n–k) least significant bits to be dropped; and adding said particular fixed pattern signal selected to an upper k significant bits of said n-bit digital data to yield rounded k bits of digital data.

13. A method for recovering n-bit digital data from rounded k-bit digital data, where k<n, said method comprising the steps of:

calculating a difference between current k-bit digital data and k-bit digital data preceding said current k-bit digital data by a predetermined period;

consecutively delaying said difference by said predetermined period; and inferring (n–k)-bit truncated data using said current calculated difference and delayed difference data, wherein said (n–k) bits inferred is used as recovered data to be concatenated as low order bits with said k-bit digital data to form said recovered n-bit digital data.

* * * * *